INVENTORS C. E. BROOKS
G. B. CROFUTT, JR.
J. L. HENRY
W. C. SAND
BY S E Hollander
ATTORNEY

DISTRIBUTED TELEPHONE LINE CONCENTRATOR

Filed Dec. 29, 1960 5 Sheets-Sheet 2

INVENTORS C. E. BROOKS
G. B. CROFUTT, JR.
J. L. HENRY
W. C. SAND

BY S E Hollander

ATTORNEY

DISTRIBUTED TELEPHONE LINE CONCENTRATOR

Filed Dec. 29, 1960 5 Sheets-Sheet 3

INVENTORS C. E. BROOKS
G. B. CROFUTT, JR.
J. L. HENRY
W. C. SAND
BY S E Hollander
ATTORNEY

DISTRIBUTED TELEPHONE LINE CONCENTRATOR

Filed Dec. 29, 1960 5 Sheets-Sheet 4

INVENTORS C. E. BROOKS
G. B. CROFUTT, JR.
J. L. HENRY
W. C. SAND
BY S E Hollander
ATTORNEY

DISTRIBUTED TELEPHONE LINE CONCENTRATOR

Filed Dec. 29, 1960 5 Sheets-Sheet 5

INVENTORS C. E. BROOKS
G. B. CROFUTT, JR.
J. L. HENRY
W. C. SAND
BY S F Hollander
ATTORNEY United States Patent Office 3,123,674
Patented Mar. 3, 1964

3,123,674
DISTRIBUTED TELEPHONE LINE CONCENTRATOR

Chester E. Brooks, Montvale, George B. Crofutt, Jr., Verona, James L. Henry, Madison, and William C. Sand, Chatham, N.J., assignors to Bell Telephone Laboratories, Incorporated, New York, N.Y., a corporation of New York Filed Dec. 29, 1960, Ser. No. 79,415
23 Claims. (Cl. 179—18)

This invention relates to remote telephone line concentrators and more particularly to distributed line concentrators in which the remote concentrator equipment is subdivided into component switching elements individual to subscribers and distributed in the field contiguous to the location of those subscribers in lieu of being concentrated in a centralized remote location.

Remote line concentration has become a center of increasing attention from telephone switching technologists. In part, this is attributable to the economic advantages which derive from reductions in outside plant expenditures. A remote line concentrator presupposes a grouping or "concentration" of a relatively larger number of substation lines at a locale remote from the central office. From this locale a lesser number of trunks is extended to the office. Manifestly, the lines are not individually extended directly to the office, but instead terminate at the remote concentrator. Since concentration ratios of 5 to 1 (lines to trunks), for example, are not unusual, the savings through concentration are considerable—particularly in light of the enormous investment in outside plant.

A number of prior art centralized remote line concentrators, although completely operative and useful, suffer certain limitations which stem from their design philosophy. Thus certain prior devices were predicated on the theory that the remote line concentrator should literally concentrate the lines at a single central remote locale. This type of reasoning is understandable since telephone central offices are themselves, in one sense, centralized locales at which a large number of lines are concentrated and given only percentage access to common equipment such as operator positions, intraoffice trunks, outgoing trunks, registers, etc.

Nevertheless, a compelling motivation for line concentration was the desire to avoid the necessity of extending each line from the substation directly to the central office. In overcoming this burden, a number of prior contributors have imposed an essentially analogous hardship, i.e., each line must extend directly from the substation to a centralized remote line concentrator.

It is, therefore, an object of this invention to provide a remote line concentrator in which the grouping or concentration of lines at a single centralized remote locale is unnecessary.

A further object of this invention is to provide a distributed line concentrator in which the component elements of the concentrator are distributed in the field contiguous to the individual substation locations.

Perhaps one of the fundamental distinguishing attributes of line concentration is the severing of the traditional electrical bond between the line and the central office. A number of difficult problems have been generated thereby. For example, a relatively simple function in the central office such as line supervision for line off-hook, dialing, etc., heretofore possible meely by sensing the electrical condition of the line in its appearance at the central office, presents a problem since the line is no longer continuously electrically connected to the office.

In fact, the scope of this one problem is such that another complete (though peripheral) technology has been developed to cope with it.

As a result, in a number of prior art units the communication apparatus between the remote concentrator and the central office has grown into sophisticated devices of considerable complexity which generate and receive large quantities of monitoring and signaling information relative to the line and trunk supervisory conditions. It will be recognized, however, that this whole area is superfluous at least in the sense that it owes its development to the use of line concentators and was not required with direct line systems. Consequently, the facilities provided to carry the continuous signaling burden are in part defeative of the savings achieved through line concentration.

In a number of instances in which the necessity for continuous or "dynamic" scanning of the substation lines was sought to be avoided, arrangements have been made for an efficient signaling arrangement which includes a multiplicity of number group or coded control conductors extended to each of the concentrated substations. Facilities are provided for connecting each of the substation lines to the number group conductors in unique combinations according to a code representative of the identity of the substations. The manner of operation is simple. When a substation goes off-hook, for example, a current is applied to the number group conductors to which the substation is connected. Detection equipment at the central office responds to the energization of the number group conductors to identify those to which current has been applied. A simple translation of this information yields the identity of the calling substation.

This arrangement, although simple, economical, and efficient, has itself a number of limitations which must be transcended. Thus, for economy, a common number group detector is utilized at the central office and is available on a shared or percentage access basis to all of the substations.

In view of the shared nature of the detection equipment, and in further view of the relatively high usage index on certain concentrator facilities, it is entirely feasible that a service request signal which is being processed by the number group detector may be followed shortly thereafter by a further service request from a different substation. In view of the occupation of the number group detector by the first service request, certain prior circuits are arranged to deny the second service request access to the number group detector until the control equipment has fully completed its functions with respect to the first service request, i.e., extended a connection to the substation. This is manifestly wasteful since the number group detector itself may have long since completed its assigned function but is not freed to serve further calling substations.

In a concentrator system described in an application of C. E. Brooks and J. L. Henry, Serial No. 79,384, filed December 29, 1960, the service request signal is generated as a momentary pulse and the number group detector is released as soon as it has completed its function but an additional problem is presented thereby. Assuming that a first substation has generated a momentary service request pulse which is received by the number group detectors and is in the process of being reacted to by the detector, an additional service request pulse received while the detector is processing the first service request will be ignored by (actually denied access to) the detector.

The incongruity which results is that the second service requesting substation will ultimately be given access to the number group detector when it has completed the processing of the first service request, but by this time the service request pulse representing the second service request has terminated and cannot actuate the number group detectors.

It is therefore an object of this invention to provide facilities for regenerating a service request pulse which has been "lost" by being denied access to the number group detector.

It is important to observe that in the type of service request identification facilities described above, the occurrence of approximately simultaneous service requests may lead to the possibility of spurious identifications. For example, if it is assumed that a first substation is connected to number group conductors 1 and 2, and a second substation to number group conductors 3 and 4, a simultaneous off-hook condition at both substations will excite number group conductors 1, 2, 3 and 4 simultaneously. As a result, the number group detectors at the central office are exposed to the danger that an identification may be incorrectly made and that the substation requesting service was connected to conductors 2 and 3, 1 and 4, etc.

It is therefore an object of this invention to provide facilities for insuring accuracy of identification during the advent of precisely simultaneous service requests by more than one substation by precluding access to the detector circuit.

Another object of this invention is to provide for the automatic regeneration of service request information for one or two lines which have gone off-hook simultaneously or substantially simultaneously.

In some concentrators using the number group or control conductor arrangement, simplicity of control operation dictates that the same number group conductors to which the lines are connected and over which service request signals are delivered to the central office be utilized in the opposite direction to control marking of the particular crosspoints necessary to operate to connect a line to a selected trunk. Manifestly, the marking operation preempts the usage of the control conductors during the marking interval and precludes its availability to convey service request signals. Since as discussed above, the service request signal may be momentary in nature, it is possible that the service request signal initiated during the marking period be terminated or "lost" before the number group conductors are again available for transmitting service requests.

It is essential, therefore, to be capable of regenerating any service request pulses "lost" in this manner.

It is, therefore, an object of this invention to provide for the regeneration of service request indications at the conclusion of each marking cycle to reclaim any pulses "lost" during the cycle.

In certain concentrator units, remote equipment contained crosspoints for connecting the substation conductors to a selected trunk and, moreover, facilities (referred to herein as a number group relay) for disconnecting the substation from the sensory equipment to which it was usually connected to provide the desired "clean" tip and ring to the office. The latter equipment is adapted to function in the nature of the traditional "cut-off" relay utilized at the central office for divorcing the line from the conventional sensory equipment, i.e., the line relay. When the cut-off or number group relay is located at a remote point, there is always the hazard that under certain untoward conditions at the conclusion of a conversation connection, the remote crosspoints may be properly opened to divorce the line from the trunk, while at the same time the number group relay does not appropriately operate to restore the substation to its connection to the sensory equipment (in this instance the number group conductors and number group detector).

The threat here is a significant one in telephone practice, since the substation connected to the cut-off relay which has been restored is in effect a "dead" connection. Thus, the substation is disconnected from the trunk since the crosspoint contacts have successfully opened, but unfortunately is also disconnected from the number group conductors in view of the failure of the number group relay to restore the connection to the number group conductors. It is manifest that these conditions are insupportable in a telephone system since the subscriber is now completely denied access to the office equipment.

Moreover, however egregious these conditions may be in normal telephone practice, the difficulties which ensue in concentrator operations are compounded. Thus, in usual direct line practice, if the cut-off relay fails to restore, the subscriber is completely isolated from the office but the situation is at least correctable at the central office where access is available to the cut-off relay for repair adjustment, etc. In remote concentrator practice where the number group relay is located in the field and access thereto even at the remote location is a physical problem, i.e., atop a pole, underground, etc., the difficulty and expense of adjusting or restoring the number group relay is many times that of the central office.

It is therefore an object of this invention to provide for the joint and interdependent control of the crosspoint and cut-off relay at the remote location to insure that the release of the crosspoints will provide a restoration of the cut-off relay.

These and other objects of the invention are accomplished in an illustrative embodiment in which a remote line concentrator is provided which encompasses a plurality of separate line packages or switching elements unique to individual substation lines and physically disposed at a multiplicity of geographical locations proximate to the individual substations. A plurality of code or number group conductors, including a battery and ground return conductor are extended into the field to each of the lines to be concentrated. In addition, an appropriate number of speech or communication trunks are likewise extended in the field to each of the substation lines to be connected.

Access is available by a particular substation to a conventional No. 1 crossbar central office through a line package individual to the substation. The line package includes facilities for connecting a substation line to a selected combination of number group conductors in accordance with a code identifying the substation line. In addition, each line is connected to a common number group return (ground) conductor and to a common hold (battery) conductor.

Crosspoints in the package which may illustratively be magnetic reed relays are arranged to connect the tip and ring conductors of the line to corresponding conductors in each of the speech trunks in response to control signals from the central office.

When a concentrated substation goes off-hook on an originating call, current is supplied to the associated number group conductors through the line package individual to the substations and the number group conductors are observed at the centeral office by a number group detector to ascertain the identity of the service requesting substation. Advantageously, the service request signal may take the form of a short duration pulse applied to each of the associated number group conductors. As a result of the identification by the number group detectors and after appropriate translation arrangements are made to connect the calling substation to one of the speech trunks that extends to the central office the magnetic reed relay crosspoints between the speech trunks and the substation line are energized by marking signals applied over the number group conductors and the selected trunk conductors.

When the crosspoints are closed to complete the connection between the substation line and the trunk to the central office a number group relay in the line package which functions in the nature of a cut-off relay is operated to isolate the substation line from the number group conductors, thereby providing a clean tip and ring, i.e., a metallic connection to the central office. Thereafter, supervision of the call is performed conventionally until the conversation is completed and one of the subscribers disconnects. At this time, a further operation is performed to release the previously operated crosspoints and to restore the number group or cut-off relay in the line package.

The above description of operation obtains in so long as a single service request occurs without overlapping of other simultaneous service requests. If, however, two lines go off-hook simultaneously, the number group detector is arranged to preclude response to either of the service requests. Thereafter, if one of the calling subscribers flashes his switchhook, the service request pulse thus generated will be honored and the extension of a connection to the calling subscriber will be initiated. Advantageously in the present invention, the remaining subscriber will be automatically serviced through facilities for regenerating a service request signal identifying the remaining subscriber after completion of the marking function for the subscriber who flashed his switchhook contact.

An analogous situation obtains when a first calling subscriber is granted access to the number group detector which is then temporarily disabled until the service request is processed. A subsequent or second calling subscriber whose service request is initiated when the number group detector is disabled could, under certain circumstances, have "lost" his service request since the signal is momentary in nature and may terminate before the number group detector is re-enabled. This difficulty is avoided in the present invention by arrangements for automatically regenerating service request signals for any single subscriber who has generated a service request during the time that the number group detector was disabled.

In a similar manner, service request signals which were ignored because they occurred during the marking process when the number group conductors were preempted for the exclusive use of the marking circuit are regenerated to ascertain the identity of the service requesting substation.

In addition, the present invention contemplates a novel type of line package arrangement in which the line crosspoints encompass magnetic reed relays having hold windings which are in series with the number group relay in the line package. This arrangement insures that the number group relay will divorce the substation from the number group conductors when the crosspoints are operated and will restore the connection when the crosspoints are released.

This precludes the possibility of completely isolating a substation from the central office by opening the crosspoints in the line package and, failing to restore the cut-off relay, thereby continuing the isolation of the substation from the number group conductors—yielding a "dead" line.

A feature of this invention includes facilities for operating a distributed line concentrator in conjunction with a crossbar telephone office.

A further feature of this invention includes combined circuitry for the remote crosspoints and cut-off relay in a line package to provide concerted operation of the crosspoints and the cut-off relay.

An additional feature of this invention includes means at the central office for regenerating a service request signal at the line packages.

An additional feature of this invention includes facilities at the central office for regenerating service request signals after each marking operation in connecting a substation line to a trunk.

Still another feature of this invention includes means at the central office for regenerating service request signals at the line packages after a disconnect function in disconnecting a substation line from a trunk.

Still another feature of this invention includes arrangements for automatically regenerating a service request signal for a substation which has gone off-hook simultaneously with another substation.

A further feature of this invention includes facilities responsive to the reception of a service request signal from more than one substation for precluding response to said signals.

Still another feature of this invention includes facilities for regenerating the service request signal of a substation which has gone off-hook during the period that the number group detector is disabled while processing an originating call.

Still another feature of this invention includes magnetic reed relay crosspoints adapted to be held operated by current supplied from the central office.

Still another feature of this invention includes timing circuit arrangements for verifying the proper operation of the concentrator.

These and other objects and features of the invention may be more readily apprehended from an examination of the following specification, appended claims and attached drawing in which:

FIG. 1A illustrates a combined arrangement of the distributed line concentrator and the No. 1 crossbar telephone system during the processing of an originating call;

FIG. 1B indicates the combined arrangement of the line concentrator and the No. 1 crossbar office during the processing of a terminating call;

FIG. 2 indicates the remote or package circuitry including the magnetic reed crosspoint elements at a number of physically distinct remote locations contiguous to the individual subscriber's stations;

FIGS. 3 and 4 indicate the circuitry at the central office for coupling the remote equipment to the No. 1 crossbar central office; and FIG. 5 indicates the advantageous disposition of FIGS. 2–4 to disclose the instant invention.

*General Description of Operation—Originating Call*

In accordance with a particular illustrative embodiment of the present invention a distributed line concentrator is shown in conjunction with a conventional No. 1 crossbar system. In essence, the structure of the No. 1 crossbar equipment is undisturbed. As a result, the present concentrator may be classified as a "universal" type. As shown in FIG. 1A, the concentrator includes a group of packages 120, 121 and 122. These packages are individual to the substations. An applique circuit at the central office, including control facilities 123 and trunk termination 47, is shown in outline form in FIG. 1A and in detail in FIGS. 3 and 4. The conventional No. 1 crossbar equipment is shown in dotted outline in the central office. It will be observed that the points of junction between the trunk and the central office equipment include the horizontal channel of the secondary crossbar switch in the line link frame. Although the line relays (conventional existing line relays) in the central office are not shown, it is understood that an individual line relay is provided in the central office unique to each concentrated substation line. This aspect is shown in detail at line relay 4L in FIG. 4.

The manner of entrance by the concentrator substation 124 into the central office on an originating call is via the line relay. In part, this has been done intentionally in order to preserve the structural integrity of the No. 1 crossbar office and to enhance the universality of the concentrator. To facilitate comprehension of the detailed description which follows, it will be useful here to briefly outline the advantageous manner in which the distributed line concentrator is operated in combination with the No. 1 crossbar system. For preservation of clarity only those aspects of the operation of the No. 1 crossbar system which are useful in understanding the present invention are included. For a comprehensive description of the operation of the No. 1 crossbar system in establishing an originating call, reference may be made to Patent No. 2,235,803, of W. W. Carpenter, of March 18, 1941.

FIG. 1A is an outline diagram of the line concentrator apparatus as combined with the No. 1 crossbar office during an originating interoffice call from the concentrator. The line packages 120, 121 and 122 are each connected to two of the four number group leads NG1–NG4 in accordance with a code described further herein. Each of the packages is connected moreover to a ground or number group return lead MG and a common hold or battery lead RL.

A number of speech trunks, of which trunk 1 is shown as representative, are also connected to each of the line packages. The number group leads terminate at the central office in an applique circuit 123 which is used for identifying substations which are originating service requests and for other control operations explained further herein.

It is manifest from the drawing that the trunk conductors T and R extend from the horizontal level of a secondary crossbar switch in the line link frame.

In describing the operation of the invention it will be assumed that a party at substation 124 is seeking to effect a connection through the central office to a distant subscriber. When substation 124 goes off-hook, current flows through particular number group leads connected through line package 120 to substation 124 as explained in detail herein. Thus current flows through number group leads NG1 and NG2 to which substation 124 will, for the purposes of this illustration, be assumed to be connected. It will be noted, as shown in FIGS. 2–4, that the remaining packages are each connected to other unique combinations of the number group leads NG1–NG4 to specifically identify those packages and the lines (not shown) connected thereto.

The current which flows in number group leads NG1 and NG2 as a result of the off-hook condition at substation 124 is detected at the central office in applique circuit 123 as explained in detail herein and an identification of the calling substation is made through a translation of the number group leads carrying current.

Although not shown in FIG. 1A, it will be seen herein that package 120 includes equipment for generating a single relatively short duration high intensity identifying pulse on number group leads NG1 and NG2. This identifying pulse is detected in equipment shown in detail in FIG. 3 and indicated generally in FIG. 1A at applique circuit 123. In addition, applique circuit 123 includes facilities responsive when a number of service request pulses are simultaneously received from different line packages to preclude identification of any of the service requesting lines until such time as one of the parties "flashes" his switchhook.

To continue with the operation the result of the identification of the calling line is the operation of a line relay (not shown in FIG. 1 but shown in detail in FIG. 4) which is uniquely associated with the calling substation line.

In response to the operation of the line relay, the line group controller 130 and the sender link controller 131 are energized. These controller circuits select district junctor 133, sender link 134 and sender 135 and operate the necessary select and hold magnets to establish these connections. As indicated above, detailed descriptions of these operations are disclosed in Patent No. 2,235,803.

After the operation of the line relay, arrangements are undertaken in circuit 123 to effect a connection to the substation by applying a marking potential to the number group leads NG1 and NG2 unique to that substation and by simultaneously applying a marking potential to the tip conductor of the selected trunk. A crosspoint 126 is energized by the marking potentials as explained herein, and a path is extended from substation 124 through crosspoint 126, trunk 1, trunk termination 47 to the secondary crossbar switch of the line link frame 143 at the central office.

When the subscriber sender 135 is connected to the line it transmits dial tone to the calling subscriber and accepts and records the digits dialed at substation 124. The subscriber sender 135 has access to an originating marker connector 137 to select an idle originating marker 136 which then receives the information dialed by the calling subscriber into the subscriber sender 135.

In accordance with routine procedure, the marker determines from the called office code the location of the corresponding trunk group on the output of the office link frame 138 and selects an idle trunk 125 in the proper group and then establishes paths through the district link and office link frames for connecting the district junctor 133 to the selected outgoing trunk 125. When these functions have been performed the marker operates the appropriate select and hold magnets to close the crosspoints and establish the connection to outgoing trunk 125. The sender 135 then transmits the called line number to the terminating office and the connection is extended to the calling party. This completes the connection on an originating call from a substation 124 through the distributed concentrator and the No. 1 crossbar office to the called terminating office. For perspective in analyzing the distinction between lines conventionally connected to the No. 1 crossbar office and the manner in which a concentrated line is given access to the office, the manner in which a direct connected or conventional substation would have been connected to the line link frame is shown in dotted outline. Thus a conventional line would extend from the tip and ring conductors on the verticals on the line link frame to substation 123 (the prior art direct connected substation line).

In the present invention the tip and ring vertical conductors are not used for connection to the line and do not extend into the field. As will be shown herein, a conductor connected to the tip vertical of the primary switch is used for identification purposes but that conductor remains wholly within the central office and is merely extended to applique unit 123 as shown. As a departure from previous practice, the present arrangement contemplates that the tip and ring horizontals T and R on the secondary of the line link frame are extended out to the field through termination 47 and are connectable to each of the line packages as trunk 1.

*General Description of Operation—Terminating Call*

Referring now to FIG. 1B, it will be assumed that a call is to be extended from the incoming trunk 129 through the No. 1 crossbar office and the distributed concentrator to substation 124.

It will be noted that incoming trunk 129 terminates at incoming trunk circuit 140. The incoming trunk circuits appear on the horizontals of the incoming link frame 141 as shown and also on the horizontals of the terminating sender link frame 142. The incoming link frame 141 and the line link frame 143 collectively form the terminating network for completing the call through the crossbar office.

The sender link controller circuit 144 establishes a path from the incoming trunk 140 to a terminating sender 145 through a crossbar link similar to that in which the line group controller circuit 130, discussed for FIG. 1A above, operates. When the terminating sender 145 is connected to the incoming trunk circuit 140, it receives the called line number over an interoffice trunk from the originating office and when the complete number has been registered connects to a terminating marker 146 through a terminating marker connector 147. The terminating sender 145 then transfers the record of the called substation number to the terminating marker 146 which, in turn, selects an idle path from incoming trunk circuit 140 to the line link horizontal to which termination 47 is connected. In essence, the No. 1 crossbar office is internally "unaware" of the fact that the called subscriber is not directly terminated at the office and seeks to establish a horizontal channel to the line. The marker determines on which line link frame the line is "located" through the number group connector 143 and connects to the desired line link frame through the line choice connector 159. The originating office sender is then released when the record of the called number has been passed to the terminating sender 145. The marker makes a called line busy test as on a nonconcentrator call and if substation 124 is idle (sleeve conductor is at minus 48 volts) the marker extends the incoming trunk circuit through the incoming link 149 and line junctor 150 to the horizontal on which trunk 1 is terminated. Equipment in terminating circuit 47 and applique circuit 123 are then actuated to uniquely identify the number group leads associated with called substation 124 and to apply marking potentials to the number group leads and to the tip conductor of trunk 1 to operate crosspoint 126. The incoming trunk circuit 140 applies ringing current to the called line and when the call has been answered maintains supervision in the usual manner.

Substation 128 again shows in dotted outline the manner in which a substation would be connected to the line link frame 143 in accordance with prior art procedures. Here again, the extension of the horizontal level of the secondary of the line link frame as trunk 1, in effect, extends the crosspoints into the field where they appear in a multiplicity of physically separated areas contiguous to the individual substations such as crosspoint 126 at substation 124.

For a detailed description of the operation of the equipment shown in FIG. 1B in "dot-dash" outline, reference may be made to Patent 2,089,921, of W. W. Carpenter, of August 10, 1937.

*General Description of Major Components*

Referring now to FIG. 2 a group of substations 21, 219 and 220 are shown, each of which is individually connected through line packages 221–223 to the number group conductors NG1–NG4, the number group return conductor MG and the hold conductor H. Here, for purposes of clarity, the number of trunks, substations, number group conductors, etc. have been minimized although it is understood that a greater number of substations, trunks, etc. may be utilized. Illustratively, four number group conductors NG1–NG4 extend to the central office and are individually connected to number group detector relays 3NGD1–3NGD4, respectively.

Each of the substations is connected to the number group conductors in accordance with a code uniquely representative of the "concentrator number" of the station as described in detail herein. A balanced connection from the tip and ring conductor of each substation to the tip and ring conductor of each trunk is available as shown illustratively for substation 21 and trunk 1 at the contacts 212 and 214 of relay 210. The latter relay is a magnetic reed relay which is operated under the influence of windings 29 and 216. The lower contacts 215 of relay 210 are connected in series with a hold path for these relays including winding 216, the upper winding of relay 2S, and the No. 1 contacts of relay 2S.

This latter arrangement is a significant innovation since the serial connection of the number group relay 2S and the hold winding 216 of the crosspoint 210 preclude the possibility that the number group relay 2S will remain operated when the crosspoint releases. This is a serious disturbance in service which should be avoided since it presents a situation in which the substation is divorced from the number group conductors by the contacts of relay 2S and is also divorced from the trunk conductors by the opening of the crosspoint contacts 212, 214. This affords a "dead" line to a calling subscriber who has no way therefore of signaling the central office.

A call start relay 24 shown illustratively for substation 21 and also included in packages 222 and 223 for substations 219 and 220, although not shown in detail therein, is utilized during the advent of a call originating from a subscriber substation to present a parallel group of pulses to the number group conductors NG1 and NG2 during the charging of capacitor 25.

The latter pulses are detected in number group detector relays 3NGD1–3NGD4 which register the identity of the calling substation by operating corresponding translation relays 3TRSL1–3TRSL4. The basic function of the translation relays 3TRSL1–3TRSL4 is to afford a concentrator number to equipment number translation by operating a line relay, illustratively relay 4L, in the No. 1 crossbar office.

The latter relay is the conventional existing line relay in the central office individual to substation 21 and is the relay to which the line would have been connected if, in fact, it were directly connected to the office as in prior art practice.

Operation of line relay 4L represents the manner in which ingress is obtained to the No. 1 crossbar office without modifying the equipment therein. The operation of relay 4L initiates routine functions in the No. 1 crossbar office for extending a channel to the calling line which it "believes" to be connected to the vertical of the primary switch of the line link frame, as in routine practice shown illustratively in dotted outline in FIGS. 1A and 1B.

Instead, the line is not connected to the vertical of the primary crossbar switch and in lieu thereof a trunk is extended from the secondary crossbar switch horizontal level into the field at which location a vertical connection is made through the crosspoints in the line package individual to the calling substation.

Moreover, the control equipment for the concentrator is actuated when the central office attempts to effectuate a connection to the calling substation presumably connected to the vertical of the primary crossbar switch at the central office. A trunk relay energized over the sleeve conductor of the primary is actuated to connect the selected trunk to the calling substation. The concentrator number of the calling substation is, in effect, regenerated over the tip crosspoints of the primary switch using a gas tube translator 312.

It will be seen therefore that at least two translators are included in the applique circuit. The first is a translator of concentrator numbers to No. 1 crossbar equipment numbers and is represented by the contacts of relay 3TRSL–. Thus, the operation of relays 3TRSL1 and 3TRSL2 results in the operation of line relay 4L which is uniquely representative of the equipment number of substation 21. Other translation relay contacts, not shown, arranged in appropriate order, operate other line relays, not shown, individual to substations 219 and 220. For example, the line relay (not shown) associated with substation 219 would be operated as a result of the operation of translation relays 3TRSL2 and 3TRSL3, uniquely responsive to the actuation of number group conductors NG2 and NG3 to which substation 219 is connected.

A number of timing circuits including gas tube timers 321, 328 and 327 are utilized to generate predetermined time delays required in the functioning of the applique circuit. Timer 321 represents a departure from the other two since it involves a two-stage timing operation in which the relay 3TMS can be operated after a predetermined time delay involving the charging of capacitor 322 over resistance 323 and can be operated after a lesser time delay when the capacitor 322 is charged over smaller resistance 324 and the contacts of relay 3MCK1.

One of the advantageous aspects of the present invention includes facilities for recapturing or regenerating "lost" service request calls. In this respect it will be observed that the number group detectors are disabled at various times during the functioning of the applique circuit. For example, the number group detector relays 3NGD–, when operated, disable subsequent service requests by the operation of relay 3OBC. Since, as indicated heretofore, the service request pulse is only momentary in duration, a subsequent request may be lost prior to the re-enabling of the number group detector circuit.

An analogous situation may occur during a marking operation when the number group detector is disabled and also during a disconnect operation since the number group conductors are at those times occupied for other purposes.

An advantage of the present arranegment is the ability to regenerate any service requests so lost. This is done by momentarily marking the number of group conductors NG1–NG4 with the same potential as the number group return conductor to release the call start relay 2S and thereby regenerate an additional service request.

The circumstances under which the number group detector is disabled thereby requiring regeneration are numerous and include:

(1) The arrival of two simultaneous service requests resulting in the operation of relay SO as explained herein to preclude the processing of either of the service requests.

(2) Disabling of the number group detector as a result of relay 3OBC during the functioning of the number group detector.

(3) Disabling of the number group detector during a marking function on either an originating, a terminating, or disconnect call.

As a corollary advantage to this operating procedure it will be seen that in the case of two precisely simultaneous service requests arriving at the number group detector, both will be blocked to preclude an ambiguous or spurious identification. However, if either customer "flashes" the switchhook contacts, the call start relay for that substation will be released and re-energized thereby generating a fresh service request signal which will be acted upon at the central office, even though the second substation remains connected to the number group conductors. This is a significant advantage unavailable in certain prior units. Moreover, the remaining party will thereafter have his service request signal regenerated without further action on his part, i.e., without flashing his switchhook contacts and a connection will be extended to that substation.

The decisive service or operating advantage which accrues from this structural arrangement is that the number group detector circuit is permitted to function on a transient or temporary basis with each of the substation lines. As a result, the number group detector is released immediately after performing its function in order that it may process other service request calls by operating the line relay in the central office associated with the service requesting substation which line relay then acts as a memory device for extending the connection and further processing of the call.

Thus although a number of substations are connected to the number group conductors additional service requests may be received without interference and the appropriate line relays operated even though the marking operation for the previous substations has not been yet attempted. It will be observed that the subscriber's equipment cannot interfere with other service requests or marking functions being carried over the number group conductors. This is due to the relative high impedance of the subscriber's circuit (namely winding 23 of relay 24) after call start pulse of approximately 3MS has subsided. It is understood that a large ratio of initial off-hook impedance to steady-state off-hook impedance exists to establish this noninterference.

*Detailed Description—Originating Call*

Figure 1A:
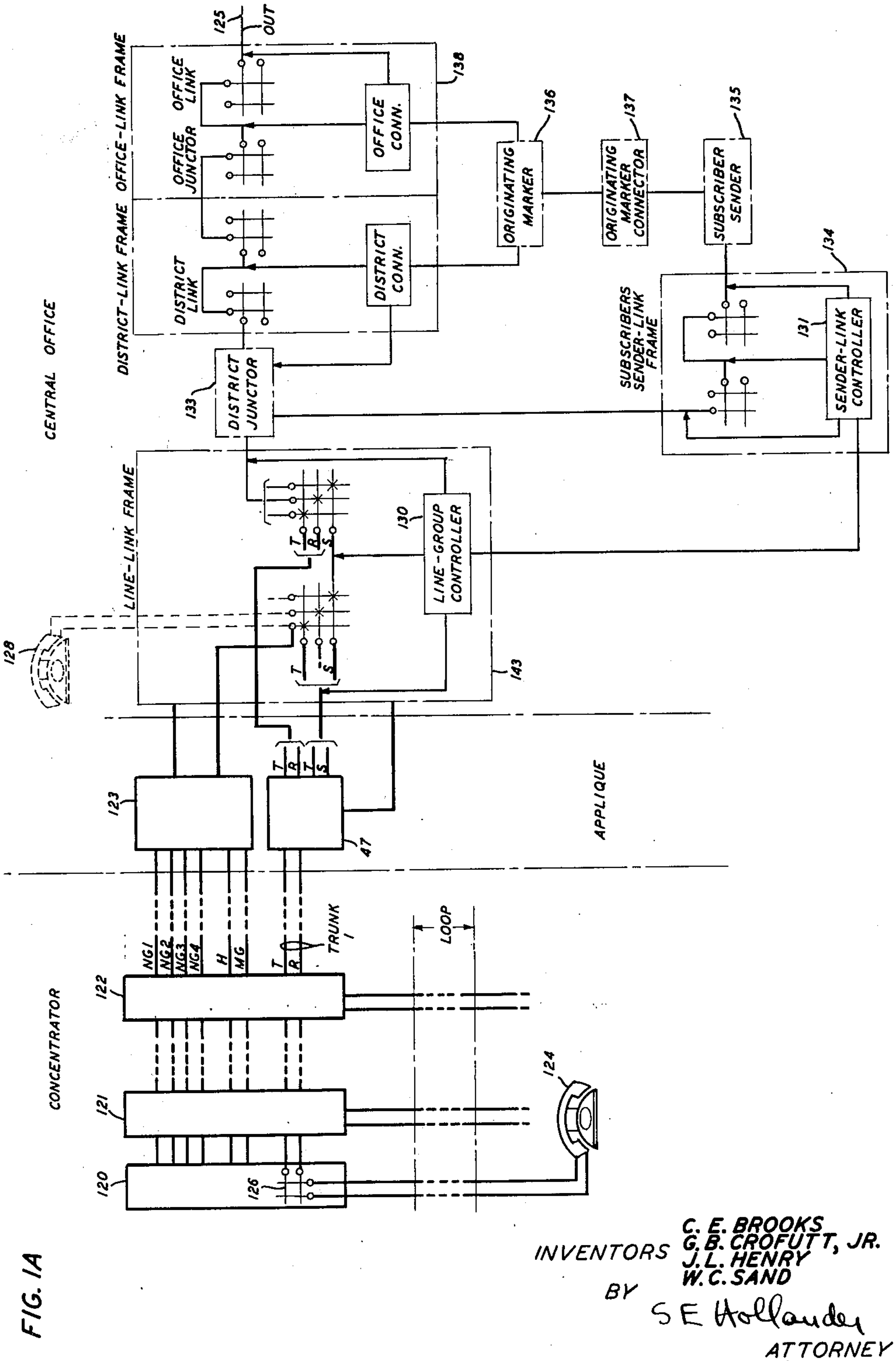

It will be assumed for purposes of illustration that a subscriber at substation 21 is initiating a service request. When the substation goes off-hook, the switchhook contacts are closed in subset 21 and a path is completed over the loop from negative battery 31, resistance 32, contacts of relays 3CO, 3NGM1, 3DST, conductor NG1, diode 22, winding 23, No. 5 contacts of relay 2S, tip conductor of the loop, through the subset, ring conductor of the loop, No. 3 contacts of relay 2S, number group conductor MG to ground in the applique circuit at the central office. A similar path may be traced from negative battery 33 over conductor NG2.

As a result of current flow through winding 23, the contacts of relay 24 are operated and extend the ground potential from conductor MG to capacitor 25 which (as the capacitor charges) transmits pulses over the number group diodes 22 and 26 and over the number group conductors NG1 and NG2. The pulse transmitted over number group conductor NG1 traverses capacitor 34 and the upper winding of relay 3NGD1, diode 36, contacts of relay 3OBC to negative battery to operate relay 3NGD1. A similar path may be traced over conductor NG2 to operate relay 3NGD2.

Relays 3TRSL1 and 3TRSL2 now operate over the contacts of relays 3NGD1 and 3NGD2, respectively, and lock operated over their own contacts and the contacts of relay 3ORL.

It will be noted that the operation of relay 3NGD1 over its upper winding would have been a momentary operation for approximately the duration of the signal pulse. However, contacts of relay 3NGD1, for example, provide a continued holding path over the lower winding of relay 3NGD1 from ground, contacts of relay 3NGD1, capacitor 37, resistance 38, lower winding of relay 3NGD1 to negative battery. This insures the continued operation of relay 3NGD1 for a period determined by capacitor 37 but sufficient to permit operation of the translation relay 3TRSL1. A similar arrangement is provided for the other number group detector relays 3NGD2–3NGD4.

Relay 3OBC operates over the contacts of relay 3NGD1, diode 39, winding of relay 3OBC to negative battery. A parallel path may be traced over the contacts of relay 3NGD2 and diode 310.

Operation of relay 3OBC removes battery source 311 at the contacts of relay 3OBC which opens the operating path of all the number group detector relays to prevent response to another subsequent service request signal by a different subscriber.

It will be noted that in the number group detector circuit, contacts of relays 3TRSL1 and 3TRSL2 operate relay 3ORL over an obvious path when relays 3NGD1 and 3NGD2 return to normal. Operation of relay 3ORL releases the translation relays 3TRSL1 and 3TRSL2 which return the entire detection circuit to the normal condition when relay 3OBC releases at the normally open contacts of relay 3TRSL–.

It is significant to observe at this juncture that the number group detection circuit is arranged to provide that an additional service request may now be received and recognized even though the first service requesting party remains connected to the number group conductors at the remote package location. This is a significant attribute of the present invention which distinguishes from certain prior art arrangements and will be described in further detail herein.

Line relay 4L, which is the conventional, existing line relay in the No. 1 crossbar office unique to the calling subscriber's line, now operates over a path including ground, contacts of relays 3SO, 3OBC, 3TRSL1, 3TRSL2, switch 416, winding of relay 4L to negative battery. Operation of relay 4L delivers a start indication to the line link controller in the No. 1 crossbar office to extend a connection to the substation line uniquely associated with relay 4L. Relay 4L locks operated over its own contacts, resistance 41 and the contacts of relay 4LH.

The No. 1 crossbar office now operates conventionally as described in FIG. 1A to extend a horizontal path or channel through the secondary and primary switches of the line link frame. Thus, the line group controller 130, and sender link controller 131 are energized to select an idle district junctor, sender link and sender, and the necessary select and hold magnets to establish the connections are operated.

Through conventional apparatus in the No. 1 crossbar office select magnet 4SM and line hold magnet 4LH are operated at the primary of the line link frame as disclosed in the above-referred-to patents. For simplicity the operation is shown symbolically by actuation of contacts 410 and 411 respectively. Relay 4MK1 operates over a path in parallel with select magnet 4SM and locks operated over its own contacts and the contacts of relays 3NGC and 3SRL. Operation of relay 4MK1 which is unique to the selected trunk causes a potential to be applied to the number group translator 312 over a path from negative battery 42, contacts of relays 3DON1, 4DISC, 3MCK1, 4MK1, tip crosspoint contacts in the primary switch, conductor 43, gas tubes 313 and 314 to operate relays 3NGM1 and 3NGM2 in parallel.

Operation of relays 3NGM1 and 3NGM2 causes the operation of relay 3CO over an obvious path. Relay 3CO locks operated over its own contacts and the contacts of relay 3SRL.

*Marking Operation*

A potential path may now be traced from 70-volt positive battery at source 314, contacts of relays 3CO, 3NGC, 3NGM1, 3DST, conductor NG1 and diode 22 for charging conductor NG1. A similar path may be traced over the contacts of relay 3NGM2 for conductor NG2.

It will be noted that the operation of relay 3CO caused the operation of relay 3SU over an obvious path. Operation of the latter relay causes the operation of relays 3NGC and 3LO.

Operation of relay 3LO prevents the initiation of a disconnect function in the applique circuit in view of the normally closed contacts of relay 3LO and connected to the winding of relay 4DISC, the disconnect relay. Operation of relay 3NGC described above causes the operation of relay 3CI over an obvious path.

As explained above, a +70-volt potential was applied over the contacts of relays 3CO and 3NGC to charge the number group conductors NG1 and NG2. When relay 3NGC operates, the +70-volt path is transferred over the contacts of relay 3MCK, winding of relay 3CK to plus 70 volts. Thus a 70-volt potential is available over conductor NG2 through resistance 27 to the anode of tube 28. At the same time, a negative 160-volt potential may be traced to the cathode of tube 28 through winding 29 over the tip conductor of trunk 1, contacts of relays 4TK1, 4TD1, 3C1, 4MK1, 3MCK1, 4DISC, 3DON1 to minus 160 volts at source 42. The 230-volt potential across tube 28 causes that tube to break down and current flow through resistance 27 develops a sufficient potential to break down gas tube 211 which thus provides a relatively low impedance path in series with winding 29. (Corresponding tubes 217, 218 in other packages experience a minus 160 to minus 48-volt or 112-volt differential which is insufficient to ionize the tube.) Increased current flow through winding 29 causes the operation of the contacts of relay 210.

When relay 210 operates, contacts 212 extend the negative 160-volt potential from tip conductor T to the left electrode of tube 213. The opposite electrode of tube 213 is connected through the winding of relay 2S to conductor MG which extends to ground potential at the applique circuit. This causes tube 213 to ionize and break down which permits the operation of relay 2S. Relay 2S in operating, at contacts 2 and 4 divorces the tip and ring conductors of the loop from the number group conductors and connects them instead to the tip and ring conductors of the trunk over contacts 212 and 214.

When relay 2S is operated, an additional circuit may be traced from ground on conductor MG, No. 1 contacts of relay 2S, upper winding of relay 2S, contacts 215 of relay 210, winding 216 of relay 210 to hold conductor H and source 315 at the applique circuit. The latter path serves as a holding path to maintain relays 2S and 210 operated.

When the crosspoint is closed, relay 3CK operates as a result of the current flow through its lower winding and over the path previously traced. Operation of relay 3CK causes the operation of relay 3MCK over an obvious path. The latter relay locks operated over its own contacts and the contacts of relay 3SRL. Relay 3MCK1 operates over the contacts of relay 3MCK. Operation of relay 3MCK removes the plus 70-volt marking potential from the number group conductors and applies negative 48-volt potential from source 336. The minus 160-volt potential at source 42 heretofore applied to the tip conductor of the trunk is removed at the contacts of relay 3MCK1.

Operation of relay 3SU described above completes a circuit for the operation of relay 3TMS in timer 321. When capacitor 322 charges to a sufficient level over the contacts of relay 3MCK1, tube 325 ionizes and relay 3TMS is operated. Timer 321 is a two-stage timer providing a given delay determined by resistor 323 and a shorter delay via resistor 324.

When relay 3TMS operates, relay 4TK1 operates from ground, contacts of relays 3TMS, 4MK1, switch 415, winding of relay 4TK1 to ground. The contacts of relay 4TK1 extend the trunk conductors to the horizontal of the secondary crossbar switch.

Current now flows over the path through the subset described above and the substation 21 receives dial tone from the subscriber sender 135 in the manner conventionally employed in the No. 1 crossbar systems as described above.

The called party's directory number is registered in the central office in response to the dialed information whereupon conventional control actions are initiated to effect a connection to the called party.

*Regeneration of Service Request Signal*

It is necessary to regenerate a service request signal for any subscriber who had initiated such signal during the marking function described above when the number group detector including relays 3NGD1–3NGD4 was disabled at the contacts of relay 3CO, or when the number group detector was disabled at the contacts of relay 3OBC. Manifestly, when the number group detector circuit is disabled it will ignore a service request signal. Moreover, in view of the momentary or pulse nature of the signal the substation remaining off-hook would not thereafter generate another signal to initiate responsive action at the central office. To cover this contingency the number group detector circuit is arranged to provide for regeneration of service request signals.

When relay 3MCK1 was operated the negative 160-volt potential from source 42 was removed from the relays 3NGM1 and 3NGM2 to release those relays. As a result, a circuit path may now be traced over conductor NG1, contacts of relays 3NGM1, 3CO, 3GR, 3LRB, resistance 316 to negative battery.

The path to minus 48 volts over resistance 316 traced above is effective in charging the number group conductors from plus 70 volts to minus 48 volts prior to the operation of relay 3LRB. When the latter relay operates at the contacts of relay 3MCK, ground is applied to the number group conductors over resistance 317, contacts of relays 3GB, 3LRB, 3GR and 3CO. The ground potential applied to the number group conductors shunts down any call start relay such as relay 24 which has been operated in view of the ground condition applied to both sides of the winding of said relay. As a result, any call start relay which was operated during the marking function is now released.

As a result of the operation of relay 3LRB, relay 3GB is operated over an obvious path and in turn causes the operation of relay 3GR. When the latter relay is operated the number group conductors are charged to a minus 48-volt potential from source 318, resistances 319, 320, 337 and 338 in parallel, contacts of relays 3GR and 3CO to the number group conductors. At this time the minus 48-volt potential applied to the number group conductors from source 318 represents the normal signaling condition on the number group conductors.

Although the number group conductors are now connected to minus 48-volt potential as in the normal condition, a call start relay such as relay 24 nevertheless does not operate in view of the magnitude of resistances 319 and 320 which reduce the current in the number group conductors below the operating current for the call start relay 24.

Previously the operation of relay 3SU initiated a timing operation in timing circuit 321. Thus a path for the charging of condenser 322 may be traced from plus 130-volt battery, resistance 323, capacitor 322, contacts of relay 3SU, winding of relay 3TMS to ground. Capacitor 322 charges in this circuit and eventually, depending on the RC time delay of resistances 323 and 322, would produce a sufficient potential at the control anode to initiate conduction in the main gap and operate relay 3TMS. However, a dual timing arrangement exists in timing circuit 321 which permits a faster operation over the contacts of relay 3MCK1 and the relatively lower resistance 324 which applies a plus 130-volt potential to capacitor 322 to cause it to charge more rapidly and to ionize tube 325 thereby operating relay 3TMS. Relay 3TCK operates as a result of the operation of relay 3TMS over an obvious path. Since relay 3GB was previously operated as indicated above, the operation of relay 3TCK causes the operation of relay 3SRL, the release relay.

Relay 3CO now releases at the contacts of relay 3SRL as does relay 3MCK. In view of the release of the contacts of relay 3CO a circuit may now be traced for the operation of the call start relay from potential sources 31 and 33 assuming that the subscriber was at substation 21. This path is identical to that described above for a service request call and will not be traced in detail herein. It is sufficient to indicate that the operation of the call start relay will regenerate pulses also as described above to operate the appropriate number group detector relays 3NGD1–3NGD4 to initiate the originating call function.

*Detailed Description—Terminating Call*

It will now be assumed that a terminating call is to be placed to substation 21 of the distributed concentrator.

Figure 1B:
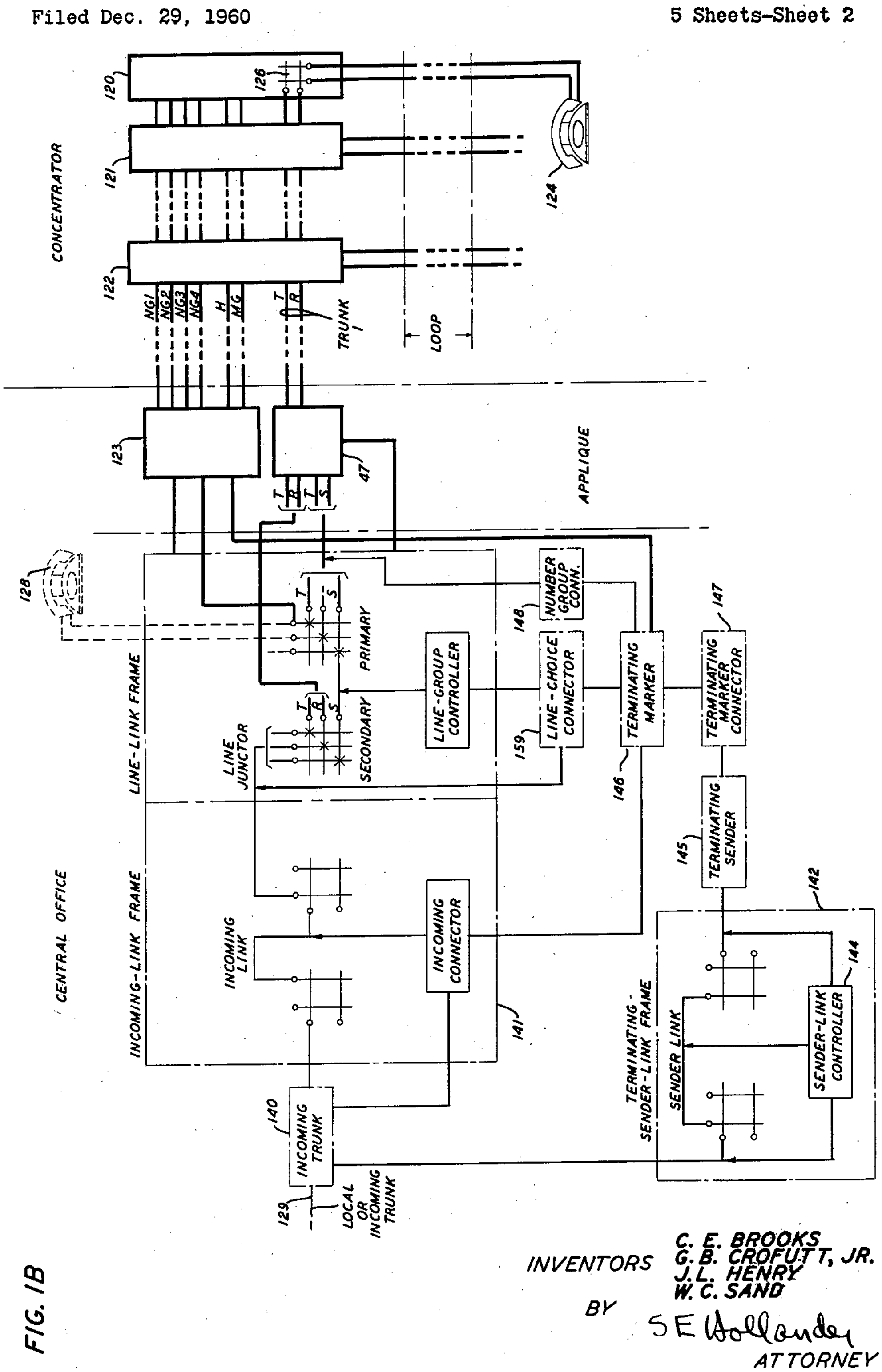
Figure 2:
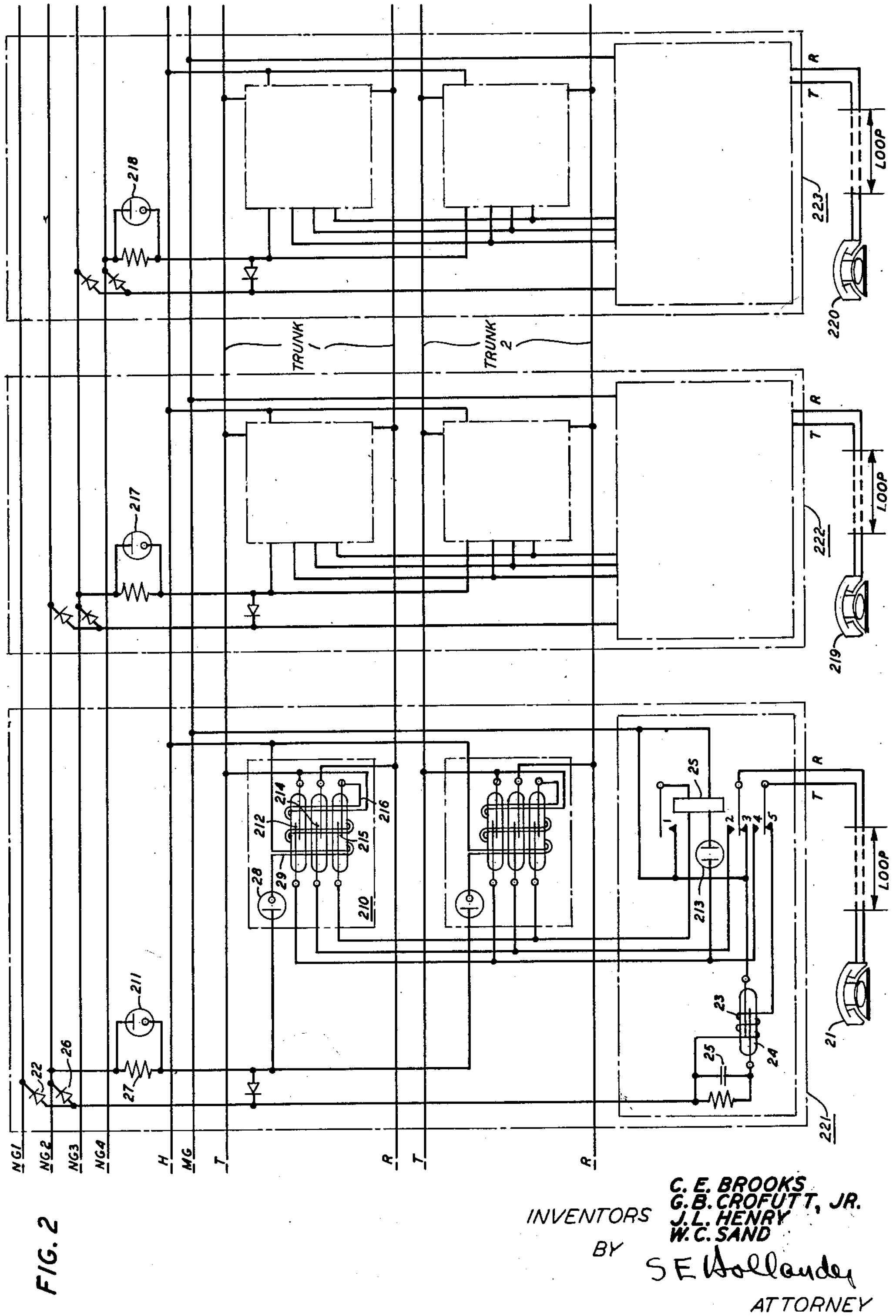
Figure 3:
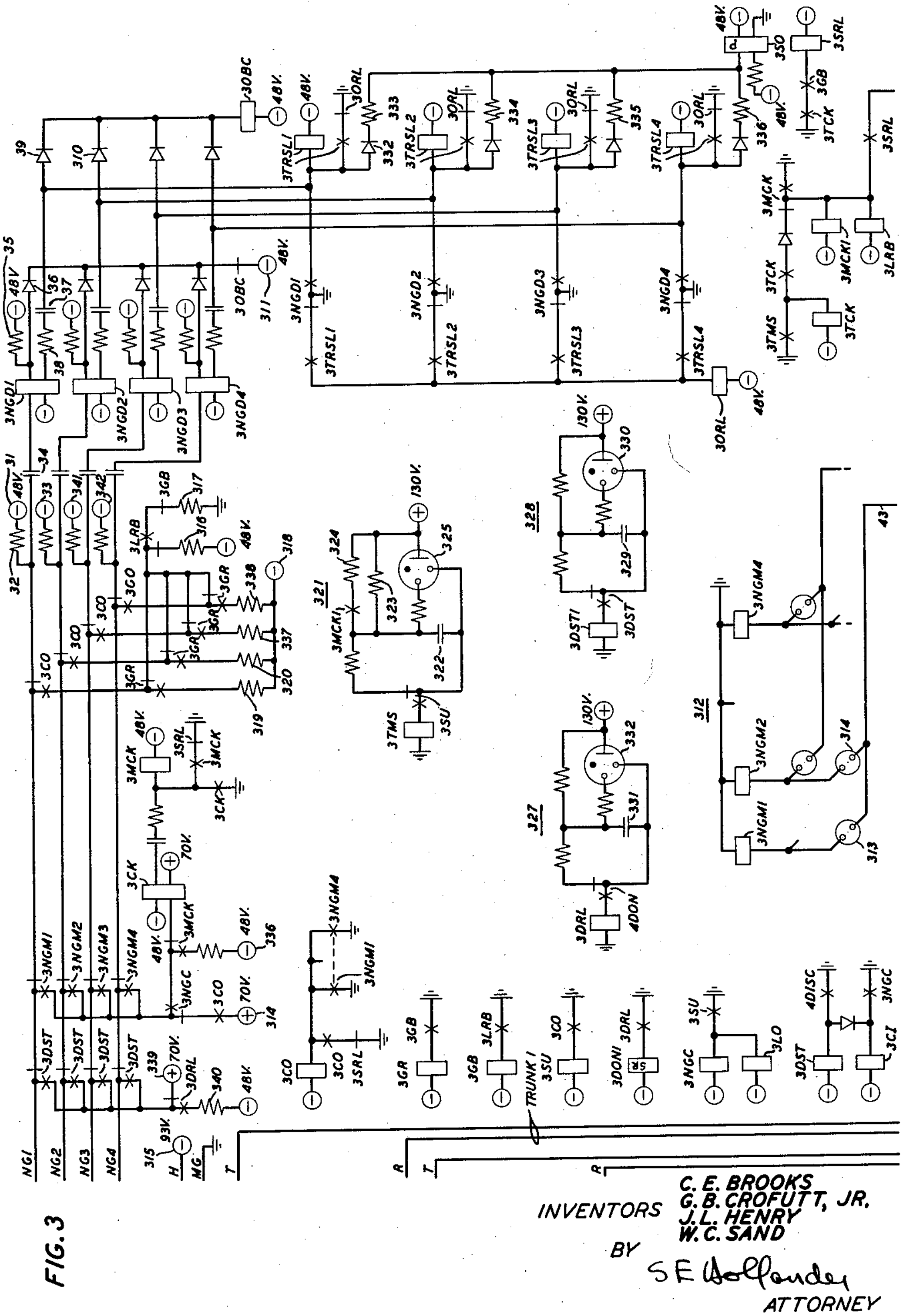
Figures 4, 5:
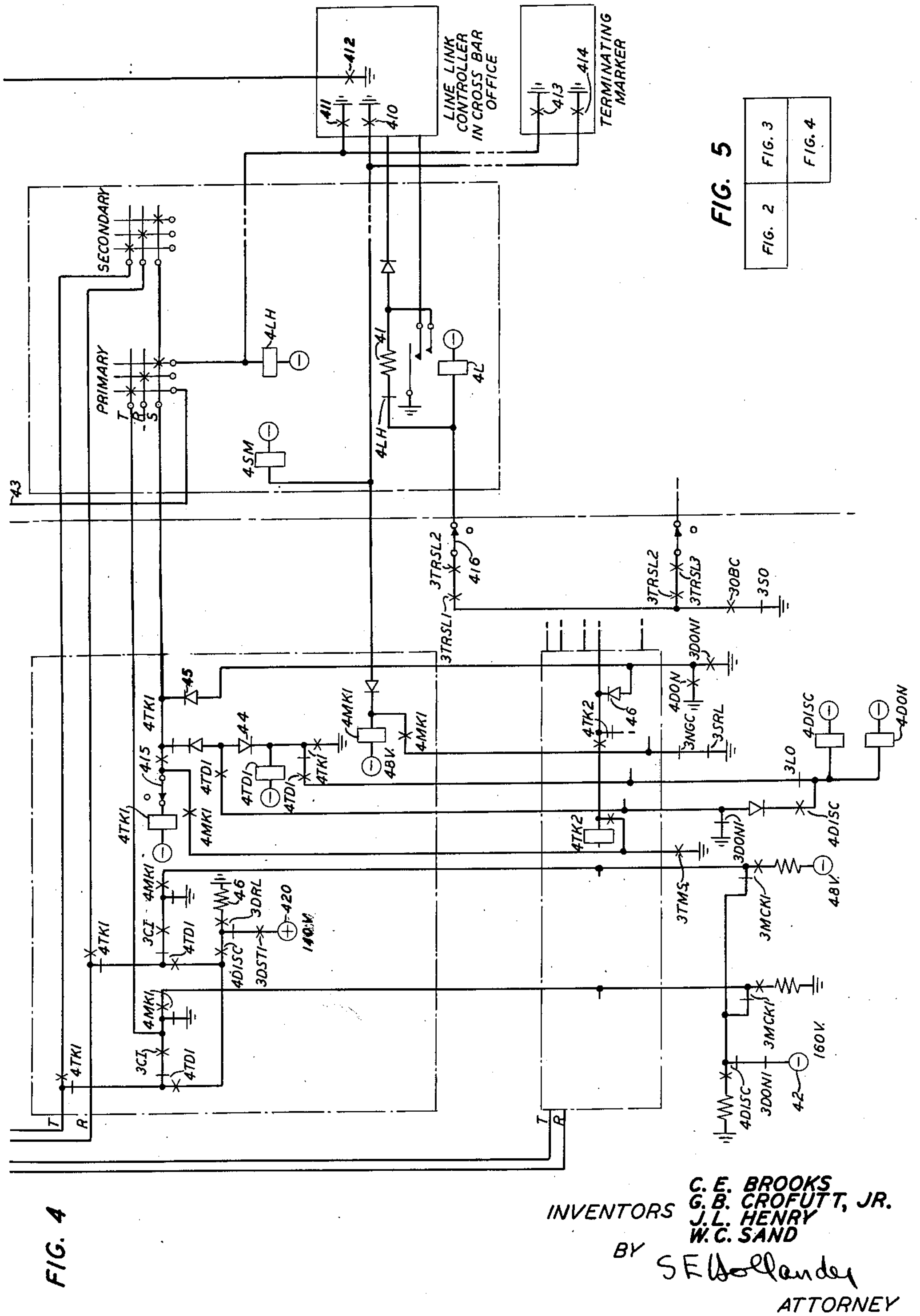

The common control equipment in the central office proceeds in a conventional manner as discussed in FIG. 1B to initiate a connection to the horizontal group of the line link frame on which the called line appears. Ultimately the select magnet 4SM and the vertical magnet 4LH unique to the called line in the central office are actuated by the terminating marker in conventional fashion shown symbolically by the actuation of contacts 414 and 413. When the vertical magnet 4LH is operated a potential is applied to the translator circuit 312 over a path from source 42, contacts of relays 3DON1, 4DISC, 3MCK1, 4MK1 (previously operated in conjunction with relay 4SM), tip crosspoints of the primary and conductor 43 to establish the "concentrator number," i.e., number group code of the called line by operating relays 3NGM1 and 3NGM2. Thereafter, the marking function is similar to that described above for an originating call.

When trunk relay 4TK1 is operated ringing signals are applied to trunk 1 via the horizontal level of the secondary crossbar switch as in conventional practice.

*Ambiguity Prevention Circuit*

It will be noted that the contacts of number group detector relays 3NGD1–3NGD4 are connected in series with diodes 332, etc., resistances 333, etc. to the upper winding of relay 3SO. A biasing current flows through the lower winding of the same relay.

Relay 3SO is designed to remain unoperated when current flows through two of the resistors 333, 334, etc. If, however, current flows through more than two simultaneously, the current through the upper winding of relay 3SO is sufficient to operate the relay. As a result relay 3SO is operated whenever more than two number group conductors are energized simultaneously.

The latter circumstances may occur when substations 21 and 219 go off-hook simultaneously thereby energizing number group conductors NG1, NG2, and NG3. Under these circumstances relays 3NGD1, 3NGD2, and 3NGD3 will be operated to deliver current through resistors 333, 334, and 335. Operation of relay 3SO immediately precludes operation of any line relay as shown by the normally closed contacts of relay 3SO in series with relay 4L. Since no line relay can operate a false connection is precluded even though the substations have simultaneously gone off-hook.

Threafter if the subscriber at substation 21 flashes his switchhook contacts, his call start relay will be momentarily released and reoperated to deliver pulses on conductors NG1 and NG2. This time since only two conductors have been energized relay 3SO will not be operated and a connection will be extended to substation 21 in accordance with the usual procedure described above.

During the marking operation for substation 21 the call start relay of substation 219 (not shown) will be automatically released as a part of the regeneration procedure described in detail above and as a result number group conductors NG2 and NG3 will be energized to actuate the number group detector which ultimately through the translation relays will extend a connection to the line relay associated with substation 219—even though the switchhook contacts at substation 219 have not been flashed by the party thereat.

*Disconnect Operation*

When the conversation is completed a release cycle is initiated when the subscriber at substation 21 returns the receiver to its cradle thereby opening the switchhook contacts. Conventional supervisory equipment in the No. 1 crossbar office (trunk supervisory relay—not shown) senses a decrease in current flow in the trunk circuit and proceeds routinely to release the connection by removing the ground condition from the sleeve conductor S extending through the primary and secondary crossbar switches, by conventional means. As a result, relay 4TK1 releases.

This prepares a path for the operation of disconnect relay 4DISC if a marking function is not currently in progress (in view of the contacts of relay 3LO in series with relay 4DISC).

Relay 4TD1 was previously operated at the contacts of relay 4TK1 over an obvious path. When relay 4TK1 releases, a path is made available for the operation of relay 4DISC from ground, contacts of relays 3DON1, 4TD1, diode 44, contacts of relays 4TK1, 4TD1, 3LO, winding of relay 4DISC to negative battery. Relay 4DN operates in parallel with relay 4DISC.

A circuit may now be traced from ground, contacts of relay 4DON, diode 46, contacts of relay 4TK2, winding of relay 4TK2 to negative battery. This path is shown to illustrate that were relay 4TK2 previously operated it cannot now release to initiate an additional disconnect operation until relay 4DON releases, in view of the ground condition applied to diodes 45, 46, etc.

Operation of relay 4DON triggers a timing circuit 327 for the operation of relay 3DRL. Relay 4DISC in operating causes the operation of the disconnect transfer relay 3DST over an obvious path. The latter relay in opertating opens the path to the number group detectors 3NGD1–3NGD4 and connects plus 70-volt battery from source 339 over the contacts of relays 3DRL and 3DST to the number group conductors.

When relay 3DST operated as described above, timing circuit 328 is energized to provide an illustrative 10-millisecond delay prior to the application of release potentials on the trunk conductors. This time delay is inserted to permit the number group conductors NG1–NG4 to be charged to a stable condition from the plus 70-volt source 339. Capacitor 329 in timing circuit 328 ultimately charges to a sufficient level to cause ionization of the control gap, permitting the main gap in tube 330 to conduct and providing a path for the operation of relay 3DST1 over the contacts of relay 3DST. Operation of relay 3DST1 completes a path for the application of a positive 140-volt release potential to the tip and ring conductors which may be traced from source 420, contacts of relays 3DST1, 3DRL, 4DISC, 4TD1 and 4TK1 to the ring conductor. A similar path may be traced to the tip conductor of the trunk.

With the positive 70-volt potential on the number group conductors and the positive 140-volt potential on the tip and ring conductors of the trunk, the potential applied to the operating winding of relay 210 is insufficient to break down gas tubes 211 and 28 since only a 70-volt difference in potential obtains.

However, a path may be traced for the ionization of tube 213 from the tip conductor of the trunk through contacts 212, tube 213, lower winding of relay 2S to the number group conductor MG which is connected to ground in the applique circuit at the central office. Relay 213 ionizes and permits current flow through the lower winding of relay 2S in a direction opposite to that which held the relay 2S operated.

The current flow through the lower winding of relay 2S opposes the current through the upper winding and thereby causes release of the relay. In releasing, the relay interrupts its own holding path over the No. 1 contacts of relay 2S and the upper winding of relay 2S and, in addition, interrupts the holding path of winding 216 through the contacts 215 of the crosspoint. When the hold winding 216 is de-energized the crosspoint is released.

In the interim, the timing circuit 327 continues to function. Capacitor 331 after the appropriate interval charges to a sufficient level to permit ionization of the control and main gaps of tube 332 to permit operation of relay 3DRL over the contacts of relay 4DON. Operation of the latter relay interrupts the positive 140-volt potential applied to the tip and ring conductors at the normally closed contacts of relay 3DRL and instead the trunk conductors are connected to ground through resistance 46 to dissipate the charge thereon. At the same time the number group conductors are connected to negative 48-volt battery through resistance 340 to charge the conductors to a stable level.

Relay 3DON1, a slow release relay, operates at the contacts of relay 3DRL. This provides an additional time delay to prevent a further disconnect operation from being initiated, in view of the application of ground potential to the sleeve link conductors over the contacts of relay 3DON1 and diodes 45, 46, etc.

Operation of relay 3DON1 interrupts the holding path heretofore traced for relay 4TD1 causing the latter relay to release. Moreover, relays 4DISC and 4DON are also released at the contacts of relay 3DON1.

Release of relay 4DISC causes the release of relay 3DST over an obvious path and the latter relay, in turn, transfers the minus 48-volt potential from resistance 340 over the contacts of relays 3NGM1–3NGM4 and 3CO to negative 48-volt battery at sources 31, 33, 341 and 342. Release of relay 3DST releases relay 3DST1 in timing circuit 328 over an obvious path. Release of relays 4DISC and 3DON1 restores a path from source 42 (minus 160 volts) to the number group translator 312 for use in processing further calls.

It will be seen from the above description of the release of relay 2S that an arrangement has been provided which in effect establishes an interdependency between crosspoint 210 and number group relay 2S. Since the hold path for crosspoint 210 is in series with the winding of relay 2S and the No. 1 contacts of relay 2S, crosspoint 210 will release whenever relay 2S is released. Since the release of relay 2S restores the substation tip and ring conductors to their connection with the number group conductors over the No. 3 and No. 5 contacts of relay 2S, the line is restored to a condition in which it may be sensed or detected at the central office number group detector via the number group conductors. The danger that relay 2S will fail to release at the time that the crosspoint 210 releases its contacts is thereby precluded. This is highly advantageous since the latter contingency, i.e., the release of crosspoint 210 and the failure to release of relay 2S will both divorce the line from its access to the central office over the trunk tip and ring conductors and at the same time will prevent access to the central office over the number group conductors. Under these conditions the substation line would be completely isolated and the subscriber on lifting his receiver would be granted a "dead" connection.

These untoward possibilities are guarded against by connecting the upper winding or hold winding (and hold contacts) of relay 2S in series with the hold winding (and hold contacts) of relay 210. As a result, release of one automatically releases the other.

*Permanent Condition on Substation Line*

An advantageous feature of this invention is invoked due to the occurrence of a "permanent" service request condition as a result of intentionally or unintentionally removing the receiver and opening the switchhook contacts. The telephone central office views the opening of the contacts as a legitimate service request and proceeds to establish a connection over a concentrator trunk to the substation line requesting service. Ultimately, as described above for FIG. 1A, the substation line is connected to a subscriber sender at the central office which transmits dial tone to the calling substation. No dialing takes place at the substation since this not a legitimate service request.

Eventually the subscriber sender will "time out" in accordance with usual central office practice and transfer the calling subscriber to a permanent tone trunk, which delivers a distinctive signal to the receiver of the off-hook substation. It will be observed, however, that a concentrator trunk remains seized although the common equipment at the central office has been released. During heavy traffic conditions, it is possible that all other trunks may be busy. Under these conditions it is possible for other legitimate service requesting substations to be denied access to any trunk and in effect granted a "dead" line, although at least one trunk has been seized as a result of a spurious service request.

To offset this disadvantage of some prior concentrators, equipment is available in the present illustrative embodiment including switch 416 connected in series with relay 4L to interrupt the normal operating path for line relay 4L.

In addition, switch 415 is shown for interrupting the path to trunk relay 4TK1.

It is understood that switch 416 is indicative of other switches connected to other line relays and switch 415 represents other switches connected in series with additional trunk relays, all of which are not shown.

By opening switch 416 and thereafter momentarily opening switch 415, relay 4TK1 will be released and insofar as the applique circuit is concerned this release will signify a disconnect operation in a manner analogous to that of the removal of the ground conditions from the horizontal sleeve conductor as described above in detail for a disconnect operation.

Thus, release of trunk relay 4TK initiates a cycle in the applique circuit for releasing trunk 1 and disconnecting the trunk to any substation connected thereto. Ultimately, the crosspoint contacts 212 and 214 are released. However, since substation 21 (illustratively assumed to be the off-hook substation) continues in an off-hook condition, an additional call start signal will be regenerated as described above during every marking and disconnect operation. In response to the call start signal the applique circuit will attempt to operate line relay 4L. However, the relay is precluded from operating since switch 416 remains in the open condition. As a result relay 4L cannot deliver a start indication to the controller to seize another trunk. In this manner the substation exhibiting a permanent condition cannot thereafter preclude access to a trunk by substations at which legitimate service requests have been originated.

It is understood that switches 415 and 416 are shown as manually operated switches for symbolic purposes and may be operated by other means well known in the art including timing means, and other circuits effective on the transfer of the calling line (and concentrator trunk) from the subscriber sender to the permanent signal trunk.

It is further understood that the above embodiments are merely illustrative and that various modifications may be made by those skilled in the art without departing from the spirit and scope of the invention.

What is claimed is:

1. A distributed telephone line concentrator including a central office, a plurality of trunks extending from said office, a greater plurality of substations remotely located from said office, a plurality of concentrator units individual to said substations and physically disposed contiguous to said substations, said units including means for connecting said substations to said trunks under control of said central office, means at said units responsive to a service request condition at said substations for transmitting a distinctive group of identifying pulses to said central office, and means at said central office for controlling said units to regenerate said identifying pulses.

2. A distributed line concentrator system including a telephone central office, a first plurality of trunks extending from said office, a second plurality of trunks extending from said office, a plurality of substations greater in number than said trunks and remotely located from said office and from each other, a plurality of remote concentrator switching units individual to said substations and disposed along the longitude of said trunks contiguous to said individual substations, said units including means connecting said substations to said first plurality of trunks and means for connecting said substations to said second plurality of trunks under control of said central office, means at said units responsive to a service request at one of said substations for transmitting a distinctive group of service request pulses over said first plurality of trunks and means at said central office for controlling said units to regenerate said service request pulses.

3. A distributed telephone line concentrator system including a central office, a plurality of trunks extending from said office, a greater plurality of substations remotely located from said central office, a plurality of concentrator units individual to said substations and contiguous to said substations for connecting said substations to said trunks under control of said central office, means at said central office responsive to service request signals at said substations for identifying said substations, and means at said central office responsive to the disabling of said identifying means for controlling said units to regenerate said service request signals.

4. A telephone line concentrator system including a telephone central office, a plurality of substations, a lesser plurality of trunks extending from said office, concentrator means for connecting said substations to said trunks, means at said concentrator means for transmitting service request indications from said substations to said office, and means at said office for controlling said concentrator means to regenerate said service request indications.

5. A telephone line concentrator system including a central office, a first plurality of trunks, a second plurality of trunks, a plurality of substations remotely located from said office and from each other, a plurality of concentrator units individual and contiguous to said substations for connecting said substations to said second plurality of trunks under control of said central office, means at said units for transmitting a unique group of identifying pulses over said first plurality of trunks in response to a service request condition at one of said substations, and means at said central office for interrupting one of said trunks in said first plurality of trunks to regenerate said identifying pulses.

6. A distributed telephone line concentrator system for connecting a plurality of substations over a lesser plurality of trunks to a central office including crosspoint means individual and contiguous to said substations, said crosspoint means including a plurality of reed relays individual to said trunks, said reed relays comprising a first pair and second pair of contacts for connecting the conductor of said substation to the conductors of said trunk, a third pair of contacts, a first winding adapted when energized to operate all of said contacts, a second winding effective when energized to hold said reed relays operated, and means for serially connecting said third pair of contacts with said second winding.

7. A telephone line concentrator system including a plurality of substations, a telephone central office, a lesser plurality of trunks extending from said office, remote crosspoint means for connecting said substations to said trunks under control of said office, sensory means connected to said substations, cut-off means for disconnecting said sensory means from said substations concurrently with the operation of said crosspoint means and for reconnecting said substation to said sensory means upon the release of said crosspoints, and means for coupling said cut-off means to said crosspoint means to prevent the release of said crosspoints without the concomitant release of said cut-off means.

8. A distributed line concentrator system including a central office, a plurality of trunks extending from said office, a greater plurality of substations remote from said office and from each other, a plurality of concentrator units individual and contiguous to said substations for connecting said substations to said trunks, sensory means normally connected to said substations for detecting the service request condition of said substations, crosspoint means for switching said substations to said trunks, number group relay means for disconnecting said substations from said sensory means upon the operation of said crosspoint means, and means for jointly controlling said number group means and said crosspoint means to preclude the release of said crosspoints without the reconnection of said substation to said sensory means.

9. A remote line concentrator system including a central office; a plurality of trunks extending from said office, a greater plurality of substations remote from said office; a plurality of concentrator units individual to said substations and physically disposed along the longitude of said trunks in contiguity to said substations; said units including crosspoint means for switching said substations to said trunks under control of said central office, sensory means normally connected to said substations, number group relays means for disconnecting said substation from said sensory means upon the actuation of said crosspoint means for coupling said number group means to said crosspoint means to effectuate the reconnection of said substation to said sensory means upon the release of said crosspoint means, and call start relay means for transmitting distinctive service request pulses unique to a service requesting substation to said central office.

10. A telephone line concentrator system for connecting a plurality of substations over a smaller plurality of trunks to a telephone central office including remote switching means for connecting a substation to a trunk under control of said central office, signaling means normally connected to said substations, cut-off means for disconnecting said signaling means from said substation, and means for connecting said cut-off means to said switching means for precluding the disconnecting of said substation from said signaling means when said substation is disconnected from said trunk.

11. An automatic telephone line concentrator system wherein a plurality of remote substations are connected over a smaller plurality of concentrator trunks to a telephone central office comprising a plurality of remote switching units individual to said substations, said units being physically disposed in a multiplicity of locations contiguous to said substations, means at one of said units responsive to a service request indication at an associated substation for transmitting a distinctive group of identifying pulses to said central office representative of the identity of said substation, and means at said central office for periodically controlling said switching unit to regenerate said identifying pulses.

12. A telephone line concentrator system for coupling a plurality of remote substations over a lesser plurality of communication trunks to a telephone central office including a plurality of remote switching units individual to said substations and physically disposed in a multiplicity of locations contiguous to said substations, sensory means at said units for detecting service request indications at said substations, switching means at said units for connecting said substations to said trunks under control of said central office, cut-off means at said switching units for disconnecting said sensory means from said substations in response to the connection of said substation to said trunk by said switching means, and additional means at said switching means for precluding release of said switching means without the corresponding release of said cut-off means.

13. A distributed telephone line concentrator system for connecting a plurality of substations over a lesser plurality of trunks to a telephone central office including a plurality of remote switching means individual and contiguous to said substations for connecting said substations to said trunks under control of said central office, said switching means including a first, second and third magnetic reed element, a first and second winding surrounding said magnetic reed elements, means at said central office responsive to a service request indication at one of said substations for energizing said first winding to operate said magnetic reed elements to provide a path between said service requesting substation and a selected idle trunk, additional means at said central office for delivering a sustaining current through said second winding to maintain said magnetic reed elements in the operated condition, and means at said switching means for connecting said third magnetic reed element in series with said second winding.

14. A distributed telephone line concentrator system for connecting a number of substations over a smaller number of trunks to a telephone central office including means at said central office responsive to a service request indication at one of said substations uniquely indicative of the identity of said substation for extending a connection to said substation, and means at said office for governing said substation to repeat said service request indication under control of said central office at intervals determined by the extension of connections to other substations by said central office.

15. An automatic telephone line concentrator system for connecting a plurality of substations over a lesser plurality of trunks to a telephone central office including means at said central office responsive to service request indications from said substations for connecting said substations to said trunks, additional means at said central office responsive to disconnect indications at said substations for disconnecting said substations from said trunks, further means at said central office responsive to said connection of said substations to said trunks for controlling said service requesting substations to regenerate service request indications uniquely indicative of said service requesting substations including, in addition, means responsive to said means for disconnecting said substations from said trunks to control said service requesting substations to regenerate service request indications uniquely identifying said service requesting substations.

16. An automatic telephone line concentrator system for connecting a plurality of substations over a smaller plurality of trunks and signal conductors to a telephone central office including switching means individual to said substations and located in a plurality of physically distinctive remote locations proximate to said substations, means at said central office responsive to a service request indication at one of said substations for connecting said service requesting substation to an idle selected trunk including means for applying marking potentials to said selected trunk and to said signal conductors, and additional means at said central office for applying predetermined potentials to said signal conductors to control said substations to regenerate service request indications uniquely identifying said service requesting substations.

17. An automatic telephone line concentrator system including a telephone central office, a plurality of remote substations, a lesser plurality of speech trunks, number group conductors, a number group return conductor and hold conductor all extending in parallel from said central office, a plurality of remote switching means individual to said substations and disposed along the longitude of said trunks and conductors in accordance with the relative physical location of said substations, said swtiching means including magnetic reed crosspoint means for connecting said substations to said trunks under control of said central office, means at said central office responsive to a service request indication at one of said substations for extending a connection to said substation over a selected idle one of said trunks including means for applying marking potentials to selected number group conductors and to said selected trunk to operate said crosspoint means individual to said substation and said selected trunk, and means at said central office for maintaining said crosspoint in the operated condition over said hold conductor.

18. An automatic line telephone concentrator system in accordance with claim 17 wherein said crosspoint means includes first, second and third magnetic reed elements, a first and second winding adjacent to said elements, means connecting said first winding to said number group conductors and means connecting said second winding to said hold conductor.

19. An automatic telephone line concentrator system in accordance with claim 18 wherein said switching means include in addition magnetic reed signaling means responsive to a service request indication at one of said substations for applying a distinctive group of pulses to said number group conductors identifying said service requesting substation.

20. An automatic telephone line concentrator system in accordance with claim 19 including in addition means at said central office for controlling said signaling means at said service requesting substation to regenerate said distinctive group of pulses at particular intervals determined by the connection and disconnection of other substations.

21. An automatic telephone line concentrator system in accordance with claim 20 wherein said control means at said central office includes means for applying equal potentials to said number group conductors and said number group return conductor for controlling said signaling means at service requesting substations to regenerate service request indications.

22. An automatic telephone system for connecting a plurality of substations over a lesser plurality of shared channels to a telephone central office including common equipment at said office responsive to service request signals from said substations for connecting said substations to selected idle channels. and additional means at said central office jointly responsive to the reception of a service request signal and the concurrent disabling of said common equipment for controlling said service requesting substation to regenerate a service request signal uniquely identifying said service requesting substation.

23. A telephone switching system for connecting a plurality of remote substations over a lesser plurality of common channels to a telephone central office including switching means remote from said office for connecting said substations to said channels, sensory means at said remote switching means for detecting the service condition of said substations, cut-off means at said remote switching means for isolating said sensory means from said substations, and means at said remote switching means responsive to the disconnection of one of said substations from said channels for preventing the failure of said cut-off means to reconnect said substation to said sensory means.

References Cited in the file of this patent

UNITED STATES PATENTS

| | | |
|---|---|---|
| 1,687,669 | Hinrichsen | Oct. 16, 1928 |
| 2,235,153 | Holden | Mar. 18, 1941 |
| 2,599,358 | Cahill et al. | June 3, 1952 |
| 2,794,121 | Bjornson | Aug. 28, 1957 |
| 2,894,073 | Blount et al. | July 7, 1959 |
| 2,976,367 | Bruce et al. | Mar. 21, 1961 |
| 2,979,571 | Libois et al. | Apr. 11, 1961 |